Patented Jan. 25, 1949

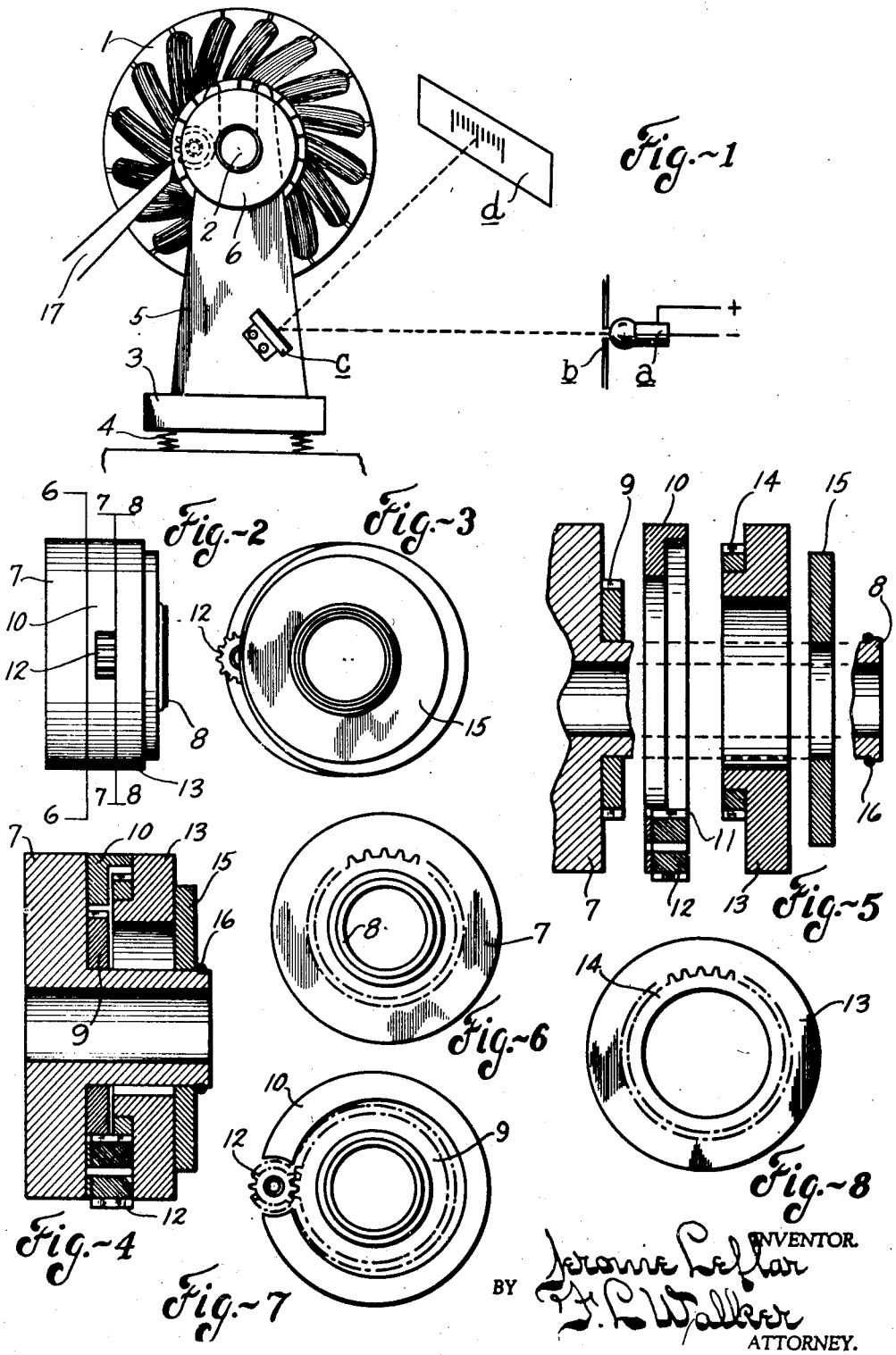

2,459,947

UNITED STATES PATENT OFFICE 2,459,947

BALANCING DEVICE

Jerome Leflar, Dayton, Ohio, assignor to The Master Electric Company, Dayton, Ohio, a corporation of Ohio Application January 31, 1944, Serial No. 520,577

14 Claims. (Cl. 74—573)

This invention pertains to a counterbalancing unit and method of minimizing vibration of rotating bodies, and more particularly to an adjustable counterbalance device and method of compensating for conditions of unbalance and dynamically balancing rotating bodies while in motion.

Bodies which rotate at high speeds, as for example electric motor armatures, must be carefully and accurately balanced. Otherwise vibration generated by even a slightly unbalanced condition is likely to prove detrimental and injurious to the rotating body and to associated portions of a machine in which the motor may be mounted.

High precision requirements of modern production necessitate substantially vibrationless operation, without which the necessary dimensional tolerances can not be maintained under changing conditions resulting from vibration of production equipment. Furthermore undue vibration results in excessive wear of machine parts, especially bearings, necessitating frequent repairs or replacements.

Although the problem of unbalance and vibration has long been recognized, particularly in the dynamo-electric machine industry for which the present invention is especially applicable, the proposed solutions of the problem have been of more or less "make-shift" character, involving trial and error methods. Various methods have been employed for subtracting or adding weight at predetermined points on the rotating body. This usually consists of progressively removing minute portions of material by filing, chipping or grinding, and particularly by drilling one or more holes of a size proportionate to the degree of unbalance. Otherwise supplemental weight is added to the lighter side of the body by applying solder or by attaching individual weights as disclosed in my prior Patent No. 2,011,495, issued August 13, 1935. Various forms of balancing machines have been devised for testing and determining the degree of unbalance and the points at which correction should be made. However in any event the exact location and size of the weight to be added or removed must be determined by trial and error methods and the rotating body must be brought to rest while the correction is being made, necessitating considerable time loss.

In the present invention there is contemplated a method of dynamically balancing rotating bodies by mechanical means, while the body continues to rotate, by utilizing the movement of the body to automatically effect adjustment of at least one of a plurality of differentially adjustable rings or discs of un-uniform size or weight rotatively and radially relative to the axis of rotation of a revoluble unbalanced body while the latter continues to rotate, until the vibratory motion of the rotating body as indicated by an associated oscillograph is compensated and reduced to a minimum.

The object of the invention is to improve the construction, as well as the application and mode of operation of counterbalancing devices for rotary bodies, whereby they may not only be simplified in construction and operation, but may be economically manufactured, and will be efficient in use, semi-automatic in operation, uniform in action, have relative few parts and be unlikely to get out of repair.

A further object of the invention is to provide a dynamic balancing device which may be mechanically adjusted through minute increments to add or subtract weight at a required point, while the body continues to rotate, thereby minimizing the time required for correcting an unbalanced condition.

A further object of the invention is to increase the accuracy of counterbalancing operations and to provide a compact, unitary assembly to be permanently associated with the counter balanced rotating body, and secured in its adjusted position to maintain the balanced condition thereof.

A further object of the invention is to provide an adjustable counter balancing weight effective as required in any one of a number of radial planes of the rotating body.

An important object of the invention is to provide an adjustable weight and slow motion adjusting means therefor by which the weight is varied at reduced speed through successive step by step movements until its finally adjusted position is reached wherein the rotating body is balanced and vibration eliminated.

A further object of the invention is to effect adjustment of a counter balance weight rotatively and radially in different radial planes.

A further object of the invention is to provide an adjustable balancing unit having the advantageous structural features and inherent meritorious characteristics and the mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is illustrated the preferred, but obviously not necessarily the only form of embodiment of the invention.

Fig. 1 is an end elevation of an electric motor rotor to which the present balancing unit has been applied, mounted on a conventional vibratory support responsive to the gyratory motion of an unbalanced rotor and schematically showing the association of an oscillograph device for indicating the magnitude of the vibratory action.

Fig. 2 is an enlarged side view of an assembled balancing unit embodying the present invention.

Fig. 3 is a peripheral view thereof.

Fig. 4 is a sectional view of the assembled unit.

Fig. 5 is a sectional view of the disassembled elements of the unit.

Fig. 6, 7 and 8 are detail face views of the different elements.

Like parts are indicated by similar characters of reference throughout the several views.

Present day production standards, involving relatively small tolerances, require precision work by both the operator and the machine tool. In order to maintain in the machine tool the minute adjustments necessary for the required degree of precision, not only must the expansion and contraction of the machine parts be controlled, but equally important is the control of machine vibration, which must be substantially eliminated.

One of the contributory causes of machine vibration has been found to be the unbalanced condition of the power supply means, whether the machine be individually powered by an electric motor, or belt driven through a series of pulleys. In view of the usual unbalanced condition of these rotating bodies, while industry is demanding that such equipment be balanced within precision standards, a means for rapid, accurate and efficient balancing of such bodies has become highly desirable by the manufacturers of such equipment.

The present unit is designed to meet this requirement, and while it is shown and described in combination with an electric motor rotor or armature, it is not limited to such specific installations, but may be used in combination with any rotating body having a shaft or hub upon which it may be mounted.

In the drawings, 1 indicates a typical electric motor rotor or armature of which 2 is the rotor shaft, shown for illustrative purposes mounted for high speed rotation on a support which is freely responsive to the vibratory influence of an unbalanced rotor. The support which, per se, forms no part of the present invention, comprises a base 3 mounted on springs 4, and carrying uprights or standards 5 in which the rotor shaft 2 is demountably engaged for rapid power rotation. Associated with the support is a simple form of oscillograph comprising a lamp $a$ which directs a beam of light through a diaphragm $b$ onto a mirror $c$ attached to the vibratory rotor support. The light beam is reflected from the mirror $c$ onto a scale or screen $d$ on which the magnitude of the vibrations is indicated by fluctuations of the light image.

Mounted on the shaft 2 is the balancing unit 6, which embodies the invention forming the subject matter hereof.

The balancing unit includes a disc 7, having a concentric integral hub or sleeve 8 fast upon the rotor shaft 2 for unison rotation. Secured upon the hub 8 in contact with the disc 7 is a gear ring 9. Surrounding the gear ring 9 in concentric relation therewith is a laterally rabbeted annulus 10, the inner diameter of which is substantially equal to the maximum diameter of the gear ring 9 in the plane of which the annulus 10 is disposed. The annulus 10 is provided with a circular recess or pocket 11, in intersecting relation with both its inner circumference and with its periphery, in which is revolubly located a gear pinion 12. The periphery of the gear pinion projects at one side inwardly of the annulus into meshing engagement with the gear 9. At its opposite side the pinion projects exteriorly of the annulus where it is accessible for operative engagement and adjustment as hereafter described. The face of the gear pinion 12 is approximately twice the width of that of the gear ring 9. Located closely adjacent to the annulus 10 is a relatively revoluble counterbalancing ring 13 surrounding the hub 8 in spaced relation therewith.

The counterbalance ring 13 has an enlarged eccentric central opening which affords ample clearance for shifting adjustment of the ring into eccentric relation with the hub 8 and shaft 2. The counterbalancing ring 13 is provided at its side adjacent the annulus 10 with an eccentrically positioned gear 14. When in assembled relation the gear 14 extends within the rabbeted side of the annulus and intermeshes with the gear pinion 12, which thus simultaneously engages both the gear ring 9 and the gear 14. The gears 9 and 14 have different numbers of teeth, which by rotation of the gear pinion are caused to rotate differentially. The gear 14 is of greater diameter than the gear 9 and contains an increased number of teeth. The ratio of the gears 9 and 14 may vary to accommodate different operating conditions. Although not a necessary or critical ratio, it has been found that a difference of only one tooth, i. e., forty four teeth upon the concentric gear 9, and forty five teeth upon the eccentric gear 14 affords a quite satisfactory combination. The several members are retained in compact relation upon the hub 8 for rotation in parallel planes by a collar 15 and a lock ring 16 seated in a peripheral groove in the hub.

The unit 6 being assembled as described is mounted on the rotor shaft 2, or concentrically connected to a revoluble body to be balanced. A tool or even a stick 17, Fig. 1, is held close to the periphery of the unit, in the path of the protruding teeth of the gear pionion 12 as the unit revolves. As the teeth of the pinion contact the tool or stick 17 at each rotation of the unit, the pinion is rotated about its own axis through a short arc.

During the course of such successive contacts and resulting partial rotations the gear pinion is caused to travel about the gear ring 9 fixed to the mounting disc 7 and hub 8, which travel motion is additional to the bodily rotation of the unit. Such travel motion of the pinion 12 transmits to the counterbalancing ring 13 a differential movement, which in the ratio mentioned amounts to the distance of one tooth for each complete travel rotation of the pinion about the gear ring 9. That is to say with forty four teeth in the gear 9 and forty five teeth in the gear 14, it will require a complete traverse of the gear 9 plus one tooth, to effect one complete rotation of the counterbalancing ring 13. The differential rotation of the balancing ring 13 relative to the annulus 10 and mounting disc 7 causes the point of greatest mass of the balancing ring to be shifted radially into eccentric relation with the mounting shaft and the disc 7 and hub 8. The shifting motion is quite gradual, requiring several successive rotations of the small pinion 12 relative to the disc and ring to effect a complete rotation and maximum eccentric projection of the balancing ring and its return to concentric relation. Each succeeding time that the balancing ring 13 makes a complete rotation it is eccentrically projected upon a different radius of the shaft and disc, and hence in a different radial position relative to the rotating body being balanced. Without arresting the rotation of the body, it is only necessary to continue the rotation of the gear pinion 12 through a series of step by step movements, as the body and unit continue to rotate, until the counter balancing ring is eccentrically projected in the required position and to the necessary degree to compensate for the condition of unbalance.

The approach to a condition of balance may be watched and the point of ultimate balance may be determined by observing the decreasing fluctuations of the projected light beam from the lamp $a$ on the graduated screen $d$, or by a conventional oscillograph or vibroscope.

The unit is operable in either direction by actuation of the gear pinion in alternate directions incident to reversal of the direction of rotation of the unit.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A counterbalancing unit for a rotating body, including a sun gear rotating in unison with the body, a relatively revoluble gear member having a number of teeth different from that of the sun gear, mounted in eccentric relation with the sun gear, a counterbalance weight carried by the revoluble gear, a planetary gear simultaneously meshing with the sun gear and revoluble gear, and a rotary mount therefor enabling the planetary gear upon rotation thereof, to travel about the sun gear and simultaneously rotate the revoluble gear relative to the sun gear to rotatively adjust the counterbalance weight carried thereby into a position wherein it will compensate for an unbalanced condition of the rotating body while all of said gears continue to rotate simultaneously about the axis of the rotating body being balanced.

2. A dynamic balancing unit for a rotary body, including a gear member mounted to rotate in unison with the body, an eccentric annulus mounted for unison rotation with the gear and rotary body and rotatively adjustable relative thereto into position to compensate for a condition of unbalance of the rotary body, a gear connected to and rotating with the eccentric annulus, having therein a number of teeth different from that of the first mentioned gear, a gear pinion having simultaneous meshing engagement with both gears, a revoluble annulus concentric with the first gear by which the pinion is carried, and beyond the periphery of which a segment of the gear pinion projects, the construction and arrangement being such that upon partial rotation of the gear pinion by engagement of its projecting segment, the pinion in its travel upon the first gear actuates the second gear differentially to adjust the eccentric annulus into a position to compensate for an unbalanced condition of the rotary body.

3. A counterbalancing device for a rotary body, including a plurality of relatively revoluble members mounted side by side for unison rotation with said revoluble body about a common axis, one of said revoluble members being rotatively unbalanced, a gear member fixedly connected with the rotary body, a second gear member having a different number of teeth connected with the unbalanced member for unison adjustment, a rotary ring surrounding said gears, a gear pinion carried by the ring and simultaneously meshing with both said gear members and operative upon relative rotation of the pinion carrying ring to differentially rotate the gear carried by the unbalanced member simultaneously with the rotation of said members in unison with the rotary body to effect adjustment of the unbalanced member into a position wherein it compensates for an unbalanced condition of the rotary body.

4. A dynamic counterbalancing unit for a revoluble body, including a sun gear mounted to rotate concentrically in unison with the body, an eccentric unbalanced annulus also revoluble in unison with the body and independently revoluble relative to the sun gear and revoluble body, a gear member carried thereby having a number of teeth different from that of the sun gear, a gear pinion meshing simultaneously with the sun gear and the gear carried by the annulus and operative coincident with the rotation of said members in unison with the body for imparting differential rotation to the annulus to vary the position of the unbalanced area thereof.

5. A counterbalancing unit for a rotary body, including a plurality of relatively rotatable members mounted for unison rotation with said body including a balanced rotatable member, an unbalanced rotatable member and a rotary actuating member, all being revoluble in unison about the axis of said rotary body, and means operative during such unison rotation about said axis for effecting independent rotation of the actuating member to effect corresponding rotative adjustment of the balanced and unbalanced member relative to the rotary body to compensate for an unbalanced condition of the rotary body.

6. A counterbalancing assembly for a rotary body, including an assembly of independently rotatively adjustable members one of which is unbalanced, mounted for unison rotation about the axis of the rotary body to be balanced, a gear train for effecting simultaneous relative rotation of said members independently of their unison rotation with said rotary body, including a gear pinion, a segment of which is accessible exteriorly of the assembly during its rotation in unison with said body to effect differential adjustment of the balanced and unbalanced member to compensate for an unbalanced condition of the rotary body.

7. A counterbalancing device for a rotary body, including a rotatively adjustable unbalanced eccentric member mounted for unison rotation with said rotary body and an adjusting device therefor for effecting simultaneous rotative and radial adjustment of the unbalanced portion of the member simultaneously with its unison rotation with the rotary body, said adjusting device being intermittently engagealbe with a relatively stationary member during its rotation in unison with the body to effect step by step adjustment of the rotary member to compensate for an unbalanced condition of the rotary body.

8. A counterbalancing unit for a rotary body comprising a plurality of relatively rotatable annular members mounted in parallel offset planes for unison rotation with the rotary body, including at least one unbalanced member, gear means for effecting independent relative rotation of at least one of said members additional to and coincident with their unison rotation with said body, including a gear pinion, a segment of which projects beyond the periphery of the rotatable members for intermittent engagement at each rotation of said members in unison with the rotary body with a member projecting into the path of rotation thereof, to effect successive step by step adjustment of the rotary member to compensate for an unbalanced condition of the rotary body.

9. A counterbalancing unit for a rotary body, including an adjustable member having varying degrees of unbalance mounted for rotation in unison with said body and capable of independent adjustment to variously position the unbalanced member both radially and circumferentially of the rotating body coincident with said unison rotation and a single adjusting device therefor operative to effect relative rotary adjustment of the member and simultaneously therewith to vary the degree of unbalance to compensate for an unbalanced condition of the rotary body.

10. A dynamic counterbalancing device for a rotary body, including a rotary member mounted for unison rotation with the rotary body about a common axis, and independently eccentrically rotatable relative thereto coincident with its unison rotation with the body into a position wherein it compensates for an unbalanced condition of the rotary body, including an adjusting device rotating in unison therewith and intermittently engageable with a member projecting into its path of rotation to effect upon successive rotations step by step adjustment of the rotary member into different positions of eccentricity with the axis of rotation to compensate for an unbalanced condition of the rotary member.

11. A dynamic counterbalancing device for a rotary body, including a rotary member mounted for unison rotation with the rotary body about a common axis, and independently adjustable coincident with its unison rotation with the body into varying degrees of eccentricity wherein it compensates for an unbalanced condition of the rotary body, including an adjusting device rotating in unison therewith and intermittently engageable with a member projecting into its path of rotation to effect upon successive rotations step by step rotative adjustment of the rotary member to present a varying degree of eccentricity in different peripheral positions about its axis of unison rotation with said body to compensate for an unbalanced condition of the rotary body.

12. A dynamic balancing unit, including a plurality of annuli axially disposed side by side, one of the annuli being eccentric and heavier at one side than at its opposite side, and common actuating means for imparting relative rotation to the annuli through a step by step movement simultaneously with the unison rotation of the assembly about common axis, the construction and arrangement being such that the eccentricity of said one annuli is progressively varied radially and rotatively.

13. A counterbalancing unit for a rotating body, including a gear element mounted to rotate in unison with the body to be balanced, an unbalanced eccentrically mounted gear member having a number of teeth different from that of the first mentioned gear, a gear pinion having simultaneous engagement with both gear members, a rotary support for the gear pinion, the construction and arrangement being such that by rotation of the gear pinion, the eccentrically mounted gear member will be adjusted through a step by step movement into a position to compensate for a condition of unbalance of the rotating body.

14. A balancing device for a rotary body wherein an adjustable counterweight is revoluble simultaneously with the rotation of the body, including a pair of gear members having different numbers of teeth and a gear pinion simultaneously engageable with both gear members subject to successive partial rotations simultaneously with and additional to the rotation of the rotary body and adjustable counterweight by which the counterweight is progressively adjusted to a position wherein it compensates for an unbalanced condition of the rotary body.

JEROME LEFLAR.

REFERENCES CITED

The following references are of record in the file of this patent:

UNITED STATES PATENTS

| Number | Name | Date |
|---|---|---|
| 1,211,488 | Reed | Jan. 9, 1917 |
| 1,296,732 | Akimoff | Mar. 11, 1919 |
| 1,678,887 | Trumpler | July 31, 1928 |